(12) United States Patent
Allen et al.

(10) Patent No.: US 6,991,665 B1
(45) Date of Patent: Jan. 31, 2006

(54) EVERTIBLE FILTER WRAP WITH STRAPS

(75) Inventors: F. Burke Allen, Houston, TX (US); Frank Sequino, Hilton, NY (US); Rick Wells, West Henrietta, NY (US); Gary Clements, Livonia, NY (US)

(73) Assignee: Graver Technologies, Inc., Glasgow, DE (US)

( * ) Notice: Subject to any disclaimer, the term of this patent is extended or adjusted under 35 U.S.C. 154(b) by 0 days.

(21) Appl. No.: 10/774,162

(22) Filed: Feb. 6, 2004

(51) Int. Cl.
*B01D 46/00* (2006.01)
*B01D 50/00* (2006.01)

(52) U.S. Cl. ............... 55/379; 55/380; 55/490; 55/501; 55/511; 55/529; 55/492; 210/315; 210/342; 210/417; 210/451; 210/455; 210/489; 210/498

(58) Field of Classification Search ............... 55/379, 55/380, 490, 492, 501, 511, 529; 210/315, 210/342, 417, 451, 455, 489, 498
See application file for complete search history.

(56) References Cited

U.S. PATENT DOCUMENTS

| | | | | |
|---|---|---|---|---|
| 3,396,517 A | * | 8/1968 | Schwab | ............... 55/368 |
| 3,500,991 A | * | 3/1970 | Vogt | ............... 198/714 |
| 3,538,686 A | * | 11/1970 | Schwab | ............... 55/377 |
| 3,825,124 A | * | 7/1974 | Davis | ............... 210/330 |
| 4,022,695 A | | 5/1977 | Howard et al. | |
| 4,211,543 A | | 7/1980 | Tokar et al. | |
| 4,243,397 A | | 1/1981 | Tokar et al. | |
| 4,477,270 A | | 10/1984 | Tauch | |
| 4,769,052 A | * | 9/1988 | Kowalski | ............... 210/315 |
| 5,102,436 A | | 4/1992 | Grabowski | |
| 5,151,181 A | | 9/1992 | Barry | |
| 5,156,662 A | | 10/1992 | Downing et al. | |
| 5,252,207 A | | 10/1993 | Miller et al. | |
| 5,306,321 A | | 4/1994 | Osendorf | |
| 5,529,593 A | | 6/1996 | Simmons | |
| 5,605,748 A | | 2/1997 | Kennedy et al. | |
| 5,611,922 A | | 3/1997 | Stene | |
| 5,669,949 A | | 9/1997 | Dudrey et al. | |
| 5,871,557 A | | 2/1999 | Tokar et al. | |
| 5,935,284 A | | 8/1999 | Tokar et al. | |
| 6,007,608 A | | 12/1999 | Johnson | |
| 6,015,452 A | | 1/2000 | Nespund et al. | |
| 6,221,120 B1 | | 4/2001 | Bennington et al. | |
| 6,579,336 B1 | * | 6/2003 | Duffy et al. | ............... 55/490 |

* cited by examiner

*Primary Examiner*—Minh-Chau T. Pham
(74) *Attorney, Agent, or Firm*—DLA Piper Rudnick Gray Cary US LLP; Thomas W. Ryan

(57) ABSTRACT

A filter wrap for a cylindrical filter has a sheet with an interior side facing the filter when the sheet is wrapped on the filter, and an exterior side. It also has an edge defining a main opening to the interior for receiving the filter. At least one strap is provided for the wrap with one end attached to the sheet. The strap has another accessible distal end. Pulling on the strap(s) everts the sheet as it is pulled off of the filter. This results in trapping debris residing on the exterior of the sheet within the sheet once it is everted during removal of the wrap from the filter. Installation and removal can be performed while the protected equipment remains in operation.

15 Claims, 5 Drawing Sheets

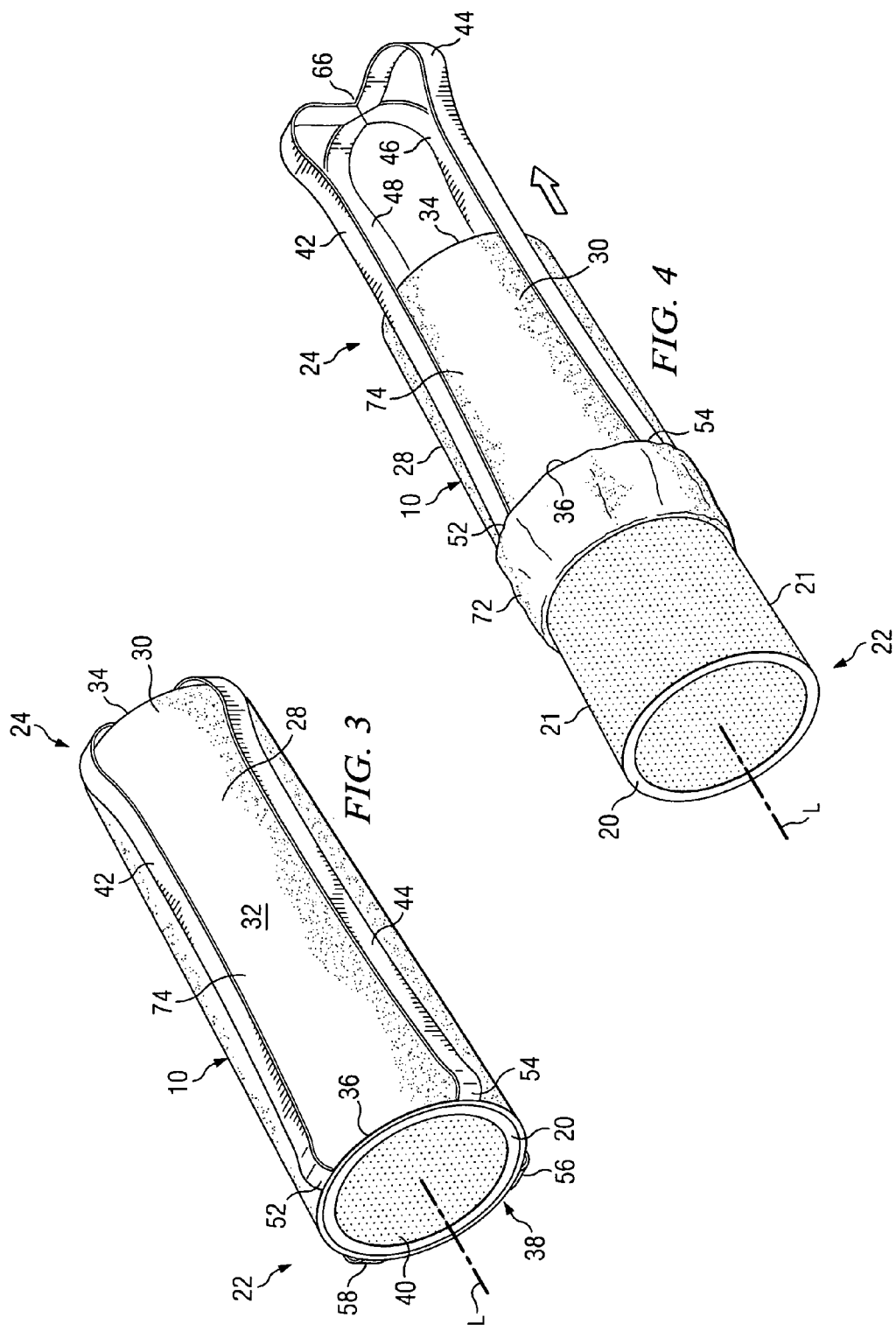

US 6,991,665 B1

EVERTIBLE FILTER WRAP WITH STRAPS

TECHNICAL FIELD OF THE INVENTION

The present invention relates generally to filters and filtration for fluid or gas systems, and more particularly to intake pre-filter wraps for filters.

BACKGROUND OF THE INVENTION

For industrial gas turbine systems, an air intake chamber is provided that includes a large number of tubular filters. Each filter has a closed end facing the inlet to the chamber, and an open end attached to the outflow section of the chamber. The air passes into the filter through the filter's porous cylindrical side and then out of the filter's open end to the outflow section of the chamber.

In the conventional design, a "pre-filter wrap" is provided, which is a sheet of porous material that is wrapped around the exterior of the filter to act as a first, coarse filter to prevent coarse or large debris from entering or attaching to the filter. This lengthens the life of the filters and prevents penetration of large debris through the filter that could damage the turbine or other device.

In such intake filtration chambers, however, the large number of cylindrical filters in the chamber are frequently so close to each other that it makes it very difficult to wrap or unwrap the pre-filter wraps around the filter in a circular motion to completely cover the cylindrical side of the filter. This awkward motion increases the time, and therefore the labor cost to maintain the filters.

Taking the filters out of a filtering position in the intake chamber to change the pre-filter wrap, however, is undesirable when the filtration is being performed on an air intake pipe or duct for a turbine or other device that must be operational at all times ("continuous operation") and does not have scheduled down times for maintenance when the filters can be changed. Permitting ambient air to enter the out flow duct section or duct through an unfiltered space while the pre-filter wrap is being changed may permit large debris to enter the air flow duct and subsequently damage or jam the motor or other device being protected.

In addition, the conventional pre-filter wrap has an openable, longitudinal seal, sealed by a clasping, sticking or hook-and-loop material such as VELCRO®, which frequently results in spaces throughout the seal for large debris to bypass the outer pre-filter wrap and be trapped by the primary filter, which reduces the service life of the primary filter.

SUMMARY OF THE INVENTION

The present invention discloses that a pre-filter wrap for a filter solves the problems mentioned above by providing a simple design that is air tight along its longitudinal seam and easy to install or remove while the primary filter remains in a filtering position. Specifically, a filter wrap for a cylindrical filter has a sheet with an interior side facing the filter when the sheet is wrapped on the filter, and an exterior side. The filter wrap also has an edge defining a main opening to the interior for receiving the filter. At least one strap is provided on the filter and has one end attached to the sheet and an accessible distal end. Pulling the strap(s) everts the sheet as it is pulled off of the filter. Debris residing on the exterior of the sheet is then trapped within the sheet upon the inversion of the sheet into a bag.

In another aspect of the invention, the filter wrap has a pliable body wrapped on the filter by moving the body over the near end. The body has an interior face initially facing the filter and an exterior face when fully assembled in a filtering position. A means for removing the body axially from the filter and over the near end while everting the body is provided so that the interior face faces outward and the exterior face faces inward.

In yet another aspect of the invention, a method of using a filter wrap, which includes providing the wrap in a rolled up state, and installing the wrap by rolling the wrap down the sides of a filter to extend the wrap along the sides of the filter. An edge of the filter defines a main opening of the rolled out interior of the wrap and is disposed at a far end of the filter. When the wrap needs to be removed, pulling on at least one strap attached to the wrap in the vicinity of the edge everts the wrap. This is done by pulling the edge from the far end and along the exterior of the wrap.

This filter wrap structure is especially desirable in filtration systems with an array of closely spaced, parallel filters. A filter wrap can easily be installed with very little space directly between adjacent filters while the filter wrap can also be removed without any need to reach directly between adjacent filters.

BRIEF DESCRIPTION OF THE DRAWINGS

Further aspects of the invention will be understood with reference to the following detailed description when taken in conjunction with the drawings, in which:

FIG. 3 is a simplified, bottom isometric view of a filter with the pre-filter wrap fully installed on the filter according to the present invention;

FIG. 4 is a simplified, bottom isometric view of the filter partially covered with the pre-filter wrap according to the present invention;

DETAILED DESCRIPTION OF ILLUSTRATED EMBODIMENT

Figure 1:
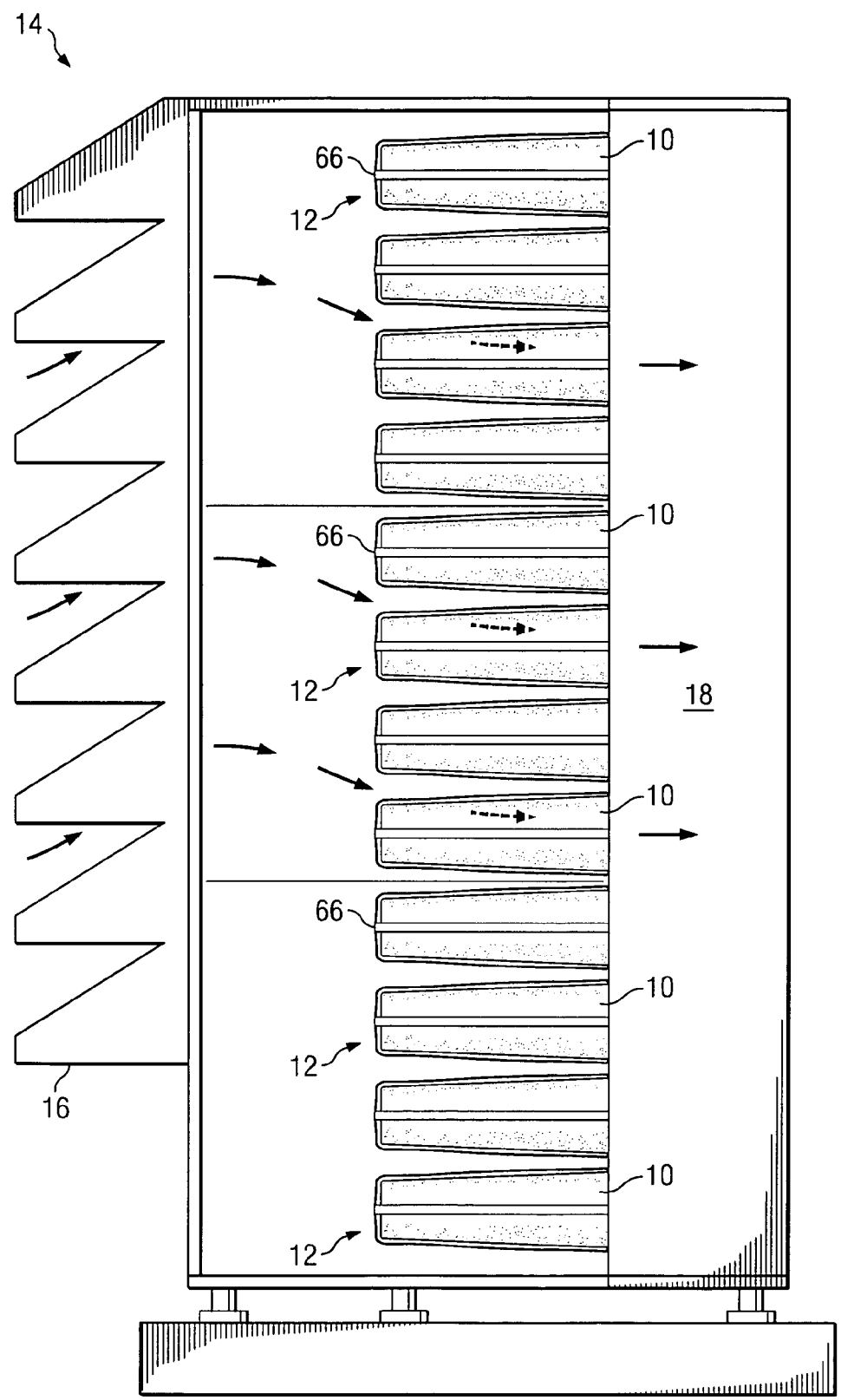
FIG. 1 is a simplified elevational cross-section showing filters in an intake chamber according to the present invention.

Referring to FIG. 1, pre-filter wraps 10 are disposed on filters 12 within an air intake chamber indicated generally at 14. It will be appreciated that chamber 14 can be any appropriate intake or other vent, ductwork, pipes, etc. on any fluid (gas or air) circulating or delivery system. In the example here, the pre-filter wraps 10 are particularly suited for air intake chambers for gas turbines such as a DONALDSON® GDS Filtration System that contain 500 to 1000 filters as their primary filters.

The chamber 14 typically has an intake duct or inlet hood 16 and an outflow duct (outflow section or side) 18. Each filter 12 is shown in FIG. 1 in its filtering position and airflow is shown by the arrows. With this structure, the material being delivered, such as dirty ambient air, flows into chamber 14 through the intake duct or inlet hoods 16, flows into the filter 12 (as shown by the arrows) and then out through the filter and into the outflow ducts or side 18.

Figure 2:
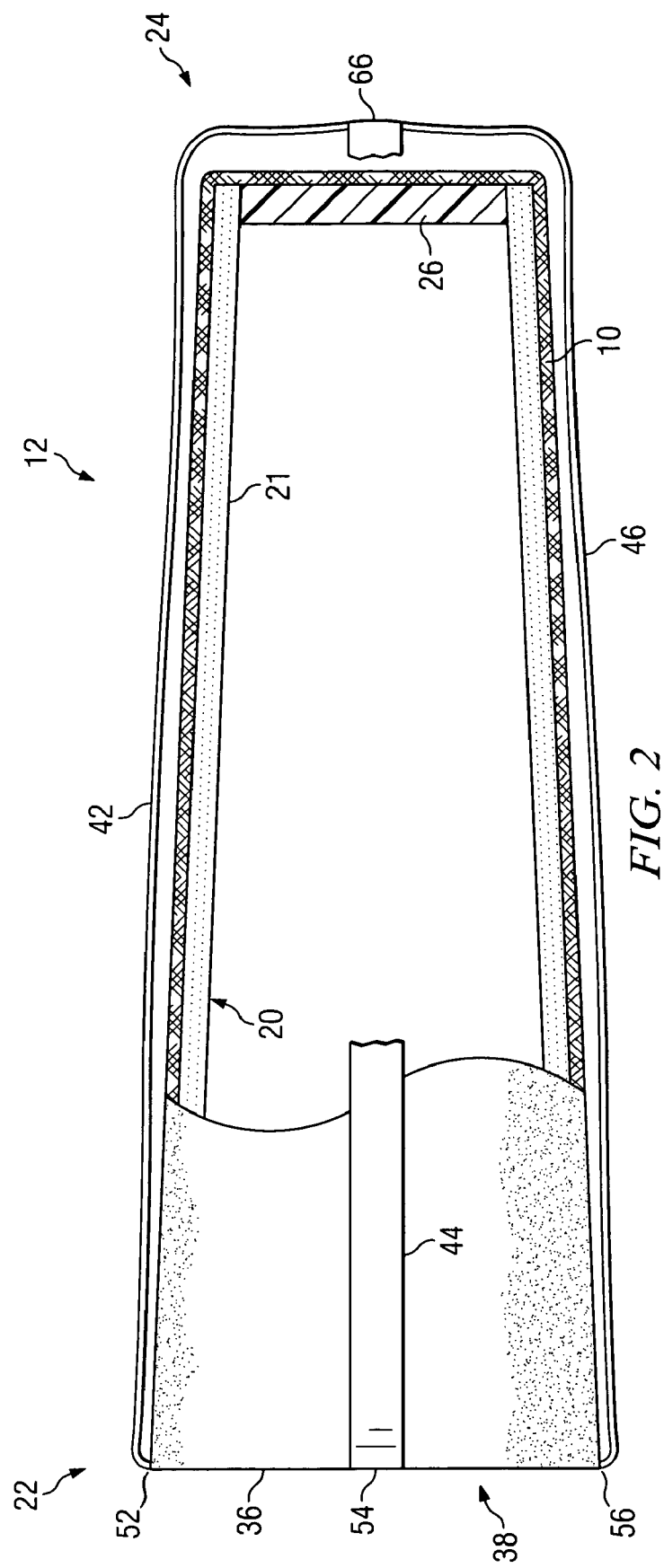
FIG. 2 is a simplified cross-sectional side view of a filter with the pre-filter wrap fully installed on the filter according to the present invention.

Referring to FIG. 2, the filter 12 can be any generally cylindrical filter such as filters for the DONALDSON® GDS systems. The filter 12 has a cylindrical porous filter element 20 and an open end 22 (also referred to as the "far end" relative to the direction of air flow through the filter 12 and chamber 14). The open end 22 is open to the outflow duct or side 18. Some of the DONALDSON® filters have a flared (not shown) far end 22 but still fall within the scope of the present invention as cylindrical. A closed capped end or "near end" 24 opposing the open end 22 has a cap 26. In the illustrated embodiment, the gas to be filtered flows through porous sidewall 21 and exits through open end 22.

Referring to FIGS. 2–6, a wrap 10 according to the invention includes a body 28, which is a membrane, sheet or film, which may be up to one inch thick and made of a flexible porous material such as polyester, polypropylene, nylon, nomex, Teflon or other synthetic material. Membrane structure may also be foam, woven, felted, or other non-woven make-up with pore sizes of 1 to 100 microns. The material should be chosen to resist degradation due to expected temperatures and chemical environment in which the filter wraps 10 are placed. The material must also be able to roll as explained below.

The wrap 10 plus filter 12 form a two-stage filtration process. The body or sheet 28 is preferably of a pre-filter wrap, and therefore, sheet 28 is porous to permit only fine particles to move through the wrap 10 and onto filter 12 for a further fine, second filtering. The coarse particles or debris (not shown) blocked by the pre-filter wrap in the first filtering stage will remain on the exterior or outside of the wrap 10, with some of the debris sticking to the exterior of the wrap 10.

The sheet or body 28 is in the shape of a bag 30 such that it has a cylindrical side 32 and a sealed bottom 34. It also may have a sealed longitudinal seam or edge (not shown). The body 28 has an edge 36 defining a main opening 38 providing access to the interior 40 of the body 28.

The wrap 10 also preferably has one or more straps, and most preferably four straps of equal length, indicated as 42, 44, 46 and 48. Each strap has one end 52, 54, 56, 58 attached to the edge 36 of the opening 38 near the far end 22 of the filter when the body 28 is fully covering the filter 12. The distal ends 59, 60, 62, 64 of the straps (indicated on FIGS. 6–7) are attachable to each other at an attachment point 66 that is preferably separate from the body or sheet 28 and the filter 12. The attachment point 66 can be positioned in the vicinity of the near end 24 of the filter 12 and over the end 34 of the wrap 10 so that it is easy for a tool or hand to grab the straps 42, 44, 46, 48 at the attachment point 66 when the pre-filter wrap 10 is the filtering position shown in FIG. 1. The attachment point is then located away from the spaces directly between adjacent filters 12. The straps 42, 44, 46, and 48 are preferably made of polyester, polypropylene, nylon, nomex, Teflon or other synthetic material.

The wrap 10 is assembled by rolling or folding a single flat sheet 28 so that its edges are aligned, and then (in a preferred embodiment) heat sealing along a longitudinal seam or edge (not shown) to form the continuous cylindrical side 32 of the bag and the sealed bottom 34. Known sealing methods such as thermoplastic bonding by hot wire, ultrasonic or other similar methods are used. The sheet 28 may also be sewn. The material used must be appropriate for the heating process if heat sealing is used.

The remaining edge 36 is left unsealed to form the opening 38. The straps 42, 44, 46, 48 are also attached to the edge 36 of the body or sheet 28 and to each other to form attachment point 66 by heat sealing, stitching or other similar permanent fastening method. It will be appreciated that other methods are known that can form the bag shape such as sewing or any other sealing method for seams, although not necessarily as effective as heat sealing, such as separate adhesives, glues, etc., depending on the material of the sheet used and what is appropriate for the type of filtration environment.

It will be appreciated that the ends 52, 54, 56, 58 of the straps do not necessarily have to be attached at the very edge 36 of the wrap 10 defining wrap opening 38. The strap ends 52, 54, 56, 58 could be attached farther up the wrap 10 as long as pulling on the straps removes the wrap from the filter while everting the wrap as explained below.

Figure 7:
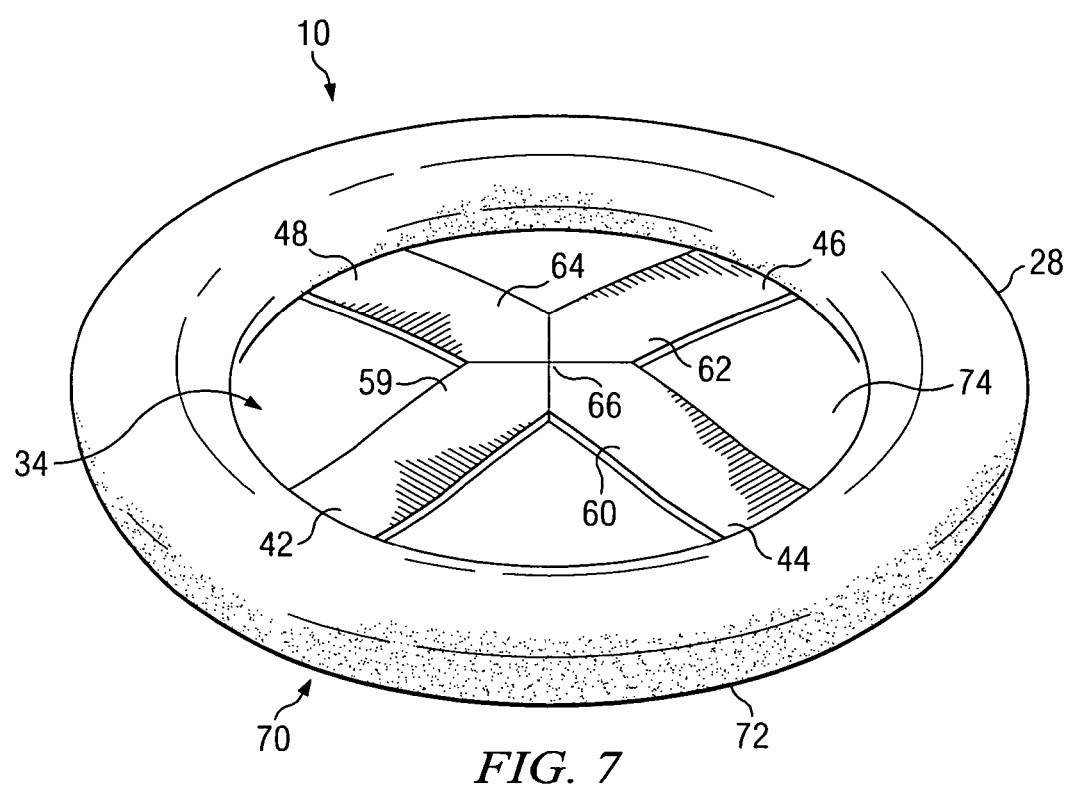
FIG. 7 is an isometric view of the pre-filter wrap in a rolled up pre-assembly configuration according to the present invention.

Referring to FIG. 7, the wrap 10 is shown in its rolled up configuration before it is placed on a filter 12. The underside 70 of this configuration is the interior side 72 of the body or sheet 28 and the exposed side in the middle of the doughnut shape or toroid, rolled-up configuration is the exterior side 74 showing the straps 42, 44, 46, 48 above it.

To install the wrap 10 on the filter 12 the underside 72 of the wrap 10, in its rolled-up configuration, is first placed on the closed near end 24 of the filter 12. The side 32 is then pushed axially down along (in the direction of the generally defined longitudinal axis L of the filter 12) the side of filter element 20 of the filter 10 to unroll the wrap 10 onto the filter 12. This can be done by hand or any tool that can push and unroll the rolled up side 30 of the wrap 10. Unrolling of the wrap 10 requires much less space on the exterior side of the filter 12 compared to placing a wrap on the filter 12 by moving the wrap circumferentially or circularly around the filter, resulting in much quicker and more efficient changing of the pre-filter wraps 10 when numerous filters 12 are placed close to each other in a chamber 14 and without removing the filter 12 from the filtering position.

Referring to FIGS. 2 and 3, the wrap 10 is shown in a completely assembled configuration fully covering the filter element 20.

Figure 5:
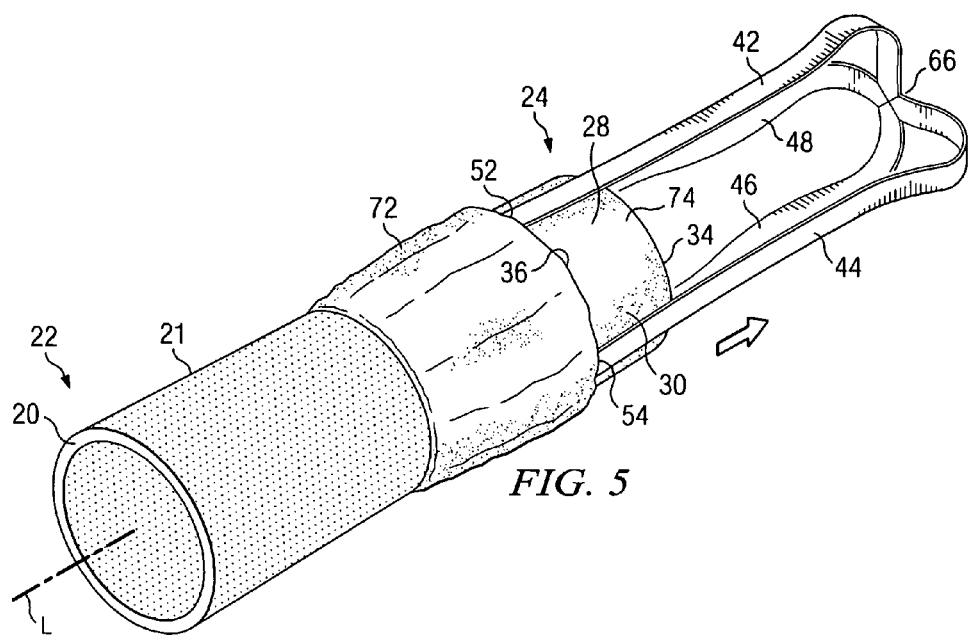
FIG. 5 is another simplified, bottom isometric view of the filter partially covered with the pre-filter wrap according to the present invention.

Referring to FIGS. 4–5, the process of removing the wrap 10 from the filter 12 is shown. The straps 42, 44, 46, 48 are grabbed by hand or tool at attachment point 66 and pulled. The straps should be of equal length to ensure point 66 is located in the vicinity of end 24 and not directly between adjacent filters 12 so that point 66 can be reached easily (see FIG. 1). However, varying the length of the straps is possible.

As shown, the pre-filter wrap 10 then moves axially over the filter 12 while it is being removed and everted to show its interior side 72. This motion traps any debris initially residing on the outside of the wrap 10 between portions of the exterior side 74 still in place and exterior side 74 that is already everted and moving off of the filter 10. In some cases, the primary filter may expand radially as it is exposed which occurs depending on the material of the primary filter element 20.

Figure 6:
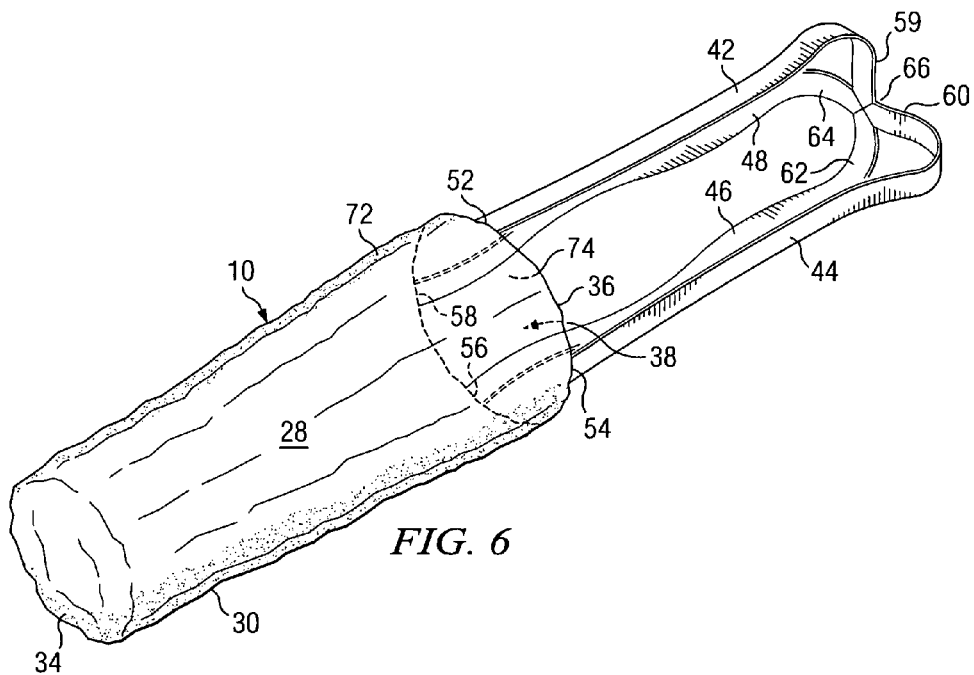
FIG. 6 is a simplified, isometric view of the everted pre-filter wrap after removal from a filter according to the present invention.

Referring to FIG. 6, once the wrap 10 is completely pulled off of the filter 12, it forms an everted bag 30 with the interior side 72 now facing out while the exterior side 74 faces inward. The debris previously sticking to exterior side 74 is now on the "new" interior of the wrap 10.

It will be appreciated that although the wrap 10 is described above as a pre-filter wrap for coarse or initial filtering, it is understood that the wrap structure with the straps could be applied with a completely sealing sheet 28 or non-porous bag 30 for protection of the filters 12, such as during manufacture, shipping and/or before installation of the filters in a filtration chamber. The strap structure of the wrap as a sealing or pre-installation cover wrap could also be useful for protection of filters installed in chambers dangerous for humans to enter for long periods of time, as the wrap can be installed and removed quickly.

It will also be appreciated that, although not preferred, while body or sheet 28 is described with a closed or sealed bottom end 34, the bottom end at the cap 26 of the filter could be left open, especially when coarse debris is expected to stick to the exterior side 74 of the sheet 28 so that the coarse debris cannot escape the wrap 10 when it is everted. This configuration would only be used, of course, if the wrap is configured tightly on the filter 12 or sticks to cap 26 so that there is no gap between the cap 26 and the interior side of the wrap 72 large enough to permit passage of large debris.

It will further be appreciated that while four straps are shown, the wrap can still be removed with one single strap, although a more balanced approach with two, three or four straps uniformly spaced around the circumferential periphery of the wrap 10 is preferred to ensure the proper eversion of the body or sheet 28 and for ensuring the strap will extend to the near end 24 of the filter 12 so that the straps remain within reach.

The advantages of the present invention are now clear. The process of rolling the body or sheet 78 of the wrap 10 axially over the filter 12 as it is installed and removed requires much less room, and therefore labor and time, on the outside of the filter 12 compared to moving the wrap circumferentially around the filter. In addition, pulling on straps 42, 44, 46, 48 attached to the body or sheet 28 of the wrap 10 to evert the body 28 as it is removed from the filter 10 traps large debris within the removed wrap 10. This can be accomplished while the equipment being protected remains in operation.

While preferred embodiments of the present invention have been illustrated in the appended drawing and described in the detailed description above, the present invention limited thereto but only by the scope and spirit of the appended claims.

We claim:

1. A filter wrap for a cylindrical filter, comprising:
   a tubular sheet having an interior side initially facing said filter when said sheet is wrapped on the filter, an exterior side and an edge defining a main opening to said interior for receiving said filter; and
   at least one strap having one end attached to said sheet near said edge and an accessible distal end wherein pulling said strap(s) everts said sheet as it is pulled off of said filter,
   wherein debris residing on said exterior of said sheet is trapped within said sheet upon the eversion of said sheet.

2. The filter wrap of claim 1, further comprising a plurality of said straps.

3. The filter wrap of claim 1, wherein said straps are uniformly spaced, and attached to said edge, around a circumference of said sheet.

4. The filter wrap of claim 2, wherein said distal end of each strap is attached to each other at an attachment point.

5. The filter wrap of claim 4, wherein said sheet has an end opposing said edge, and wherein said straps extend along said exterior of said sheet and attach to each other at said attachment point in a vicinity of said opposing end of said sheet.

6. The filter wrap of claim 1, wherein said wrap is a pre-filter wrap and said sheet is porous for providing a first filter permitting fine material to move through said sheet and into said filter and for preventing large debris from moving through said sheet.

7. The filter wrap of claim 1, wherein said sheet is in the shape of a bag with said end of said sheet opposing said edge being sealed closed and forming a bottom of said bag when said sheet is everted.

8. The filter wrap of claim 1, wherein said sheet has an initial rolled toroid up configuration, wherein said sheet can be rolled onto said filter.

9. The filter wrap of claim 8, wherein said strap(s) is attached to said sheet at said edge.

10. A filter wrap for covering a cylindrical filter with a far end and a near end, comprising:
    a pliable body wrapped on the filter by moving said body over said near end, said body having an interior face initially facing said filter and an exterior face when fully assembled in a filtering position; and
    means for removing said body axially from the filter and over said near end while everting said body so that said interior face faces outward and said exterior face faces inward.

11. The filter wrap of claim 10, wherein said body is a rollable tubular sheet, wherein said body is rolled onto the filter for placing the wrap on the filter.

12. The filter wrap of claim 10, wherein said body is in the shape of a bag with a closed end for covering said near side when said body is fully assembled on the filter and said closed end forming a bottom of said bag when said body is everted and removed from the filter.

13. The filter wrap of claim 10, wherein said means for removing includes at least one strap having an end attached to said body, wherein pulling on the strap everts said body and moves said body over said near end and off of the filter.

14. The filter wrap of claim 13, wherein said body further has an edge defining a main opening to the interior of said body and positioned around said far end of said filter, wherein said strap(s) is attached to said body in a vicinity of said edge.

15. The filter wrap of claim 10, wherein said filter wrap is a pre-filter wrap and said body is porous for permitting fine particles to move through said body and onto the filter.

* * * * *